(12) United States Patent
Calcev et al.

(10) Patent No.: US 7,688,846 B2
(45) Date of Patent: Mar. 30, 2010

(54) COOPERATIVE CSMA MODE IDENTIFICATION IN CLUSTERED NETWORKS

(75) Inventors: George Calcev, Hoffman Estates, IL (US); Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 356 days.

(21) Appl. No.: 11/932,238

(22) Filed: Oct. 31, 2007

(65) Prior Publication Data

US 2009/0109990 A1    Apr. 30, 2009

(51) Int. Cl.
*H04L 12/413*    (2006.01)

(52) U.S. Cl. ...................... 370/445; 370/462
(58) Field of Classification Search .................. 370/445
See application file for complete search history.

(56) References Cited

U.S. PATENT DOCUMENTS 6,295,285 B1    9/2001    Whitehead

FOREIGN PATENT DOCUMENTS

| WO | 0197430 A2 | 12/2001 |
| WO | 2007031961 A2 | 3/2007 |
| WO | 2007094604 A1 | 8/2007 |

OTHER PUBLICATIONS

PCT International Search Report Application No. PCT/US2008/080072 Dated Mar. 23, 2009—20 pages.
David Wright Ed: Dynamic Spectrum Access in the IEEE 802.22 Wireless Regional Area Network—XP031212412—Dated Aug. 1, 2007—6 pages.
M. Gandetto, A.F. Cattoni, C.S. Regazzoni, "A Distributed Wireless Sensor Network for Radio Scene Analysis", pp. 23, International Journal of Distributed Sensor Networks, Taylor & Francis Publishing, 2006.

*Primary Examiner*—Huy D Vu
*Assistant Examiner*—Michael J Digiovanni (57) ABSTRACT

In one embodiment, a sensing device (200) can include a transceiver (202) to monitor a communication signal, and a controller (203) communicatively coupled to the transceiver to receive from a Cluster Head (140) a schedule comprising a listening period and an active sensing period. During the listening period, the sensing device can monitor an occupied communication channel of the communication signal. During the active sensing period the sensing device can transmit in the occupied communication channel a test signal. The sensing device can increase a duty cycle of the test signal during repeated transmission, and calculate a correlation between a duration of the occupancy caused by an incumbent transmitting a communication signal in the communication channel and a duration of the test signal. A negative correlation can indicate the presence of an incumbent Carrier Sensing Multiple Access (CSMA) node transmitting a communication signal in the network.

19 Claims, 5 Drawing Sheets

|  | SN1 | SN2 | SN3 | SN4 |
|---|---|---|---|---|
| CHANNEL 1 | 0.4 | 0.40 | 0.40 | 0.40 |
| CHANNEL 2 | 0.7 | 0.70 | 0.70 | 0.70 |
| CHANNEL 3 | 1.0 | 1.00 | 1.00 | 1.00 |
| CHANNEL 4 | 1.0 | 1.00 | 1.00 | 1.00 |
| CHANNEL 5 | 1.0 | 0.99 | 1.00 | 1.00 |
| CHANNEL 6 | 0.99 | 0.82 | 0.99 | 0.99 |
| CHANNEL 7 | 0.79 | 0.61 | 0.68 | 0.73 |
| CHANNEL 8 | 0.79 | 0.48 | 0.38 | 0.58 |
| CHANNEL 9 | 0.79 | 0.52 | 0.08 | 0.39 |
| CHANNEL 10 | 0.99 | 0.67 | 0 | 0.37 |

COOPERATIVE CSMA MODE IDENTIFICATION IN CLUSTERED NETWORKS

FIELD OF THE INVENTION

The present invention relates to communication networks and, more particularly, to cooperative Carrier Sensing Multiple Access (CSMA) mode identification in a clustered network.

BACKGROUND

A cognitive ad hoc network is a paradigm for wireless communications in which either a network or a cognitive device changes its transmission or reception parameters to avoid interference with licensed or unlicensed devices. This alteration of parameters is based on the active monitoring of several factors in the external and internal communication environment, such as radio frequency usage, user behavior and network state. One method of channel access in a wireless communication system is Carrier Sense Multiple Access (CSMA). A CSMA wireless communication device will implement measures to avoid generating interference such as sensing the channel before accessing the channel in order to avoid simultaneously transmitting during the transmission of another CSMA device. Although CSMA wireless communication devices implement measures to avoid generating interference, there are times in which they may accidentally or unintentionally do so. A need therefore exits for detecting and identifying CSMA wireless communication devices in a cognitive network, and sharing resources with other devices in a fair manner.

SUMMARY

In a first embodiment of the present disclosure, a cognitive device referred also as a Sensing Node (SN) can include a transceiver to monitor a communication signal, and a processor communicatively coupled to the transceiver to receive from a Cluster Head (CH) a schedule comprising a listening period and an active sensing period. During the listening period, the SN can monitor a communication channel for the transmission of a communication signal. When a communication signal is present for a portion of the listening period, the communication channel is occupied. During the active sensing period the SN can transmit in the occupied communication channel a test signal. The SN can increase a duty cycle of the test signal during repeated transmission. The SN can calculate a correlation between a duration of occupancy caused by an incumbent in the communication channel and a duration of the test signal. An incumbent is any communication node, other than the SN, that is transmitting a communication signal. A negative correlation can indicate the presence of an incumbent, such as a CSMA node.

In a second embodiment of the present disclosure, a Cluster Head (CH) can manage a plurality of Sensing Nodes (SNs) cooperatively operating within a network. The CH can include a transceiver, and a processor communicatively coupled to the transceiver to broadcast to the plurality of SNs a schedule comprising a listening period and an active sensing period, receive from the SNs communication signal patterns associated with one or more channels of the network in accordance with the schedule, categorize SNs by Groups based on the communication signal patterns, assign a distinctive test period to the Groups, and, in response to communication signal readings provided from the Groups, evaluate a correlation that determines a presence of at least one CSMA node in the network communicating. The CH can then allocate resources in the network to share bandwidth usage in view of the presence of the at least CSMA node.

In a third embodiment of the present disclosure, a method for cognitive mode identification in a clustered network is provided. The method can include the steps of broadcasting a schedule to a plurality of Sensor Nodes (SNs) in a cognitive network, and organizing SNs by Groups based on common reported communication signal patterns. The SNs can cooperate amongst one another in accordance with the schedule to listen to communication signals on a channel and report communication signal patterns back to a Cluster Head.

The method can further include assigning a distinctive test period to the Groups for an occupied communication channel. The test period can comprise a listening period and an active sensing period for the SNs. Based on the testing period, the presence of at least one CSMA node communicating in a network can be detected. Resources can then be allocated in the network in view of the presence of the at least CSMA node, for example, to share bandwidth usage. During the test period the SNs can compare communication signal readings from the CSMA node in response to cooperatively transmitting test signals and then listening for resulting communication signals on channels. The method can include calculating a correlation between a duration of occupancy caused by an incumbent transmitting a communication signal from a CSMA node in the communication channel and a duration of the test signal. The presence of at least one CSMA node can be detected if the correlation is negative. The CSMA node can be a listen before talk device that estimates channel state and then transmits only if it perceives the channel to be unoccupied.

BRIEF DESCRIPTION OF THE DRAWINGS

The features of the system are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

Figure 1:
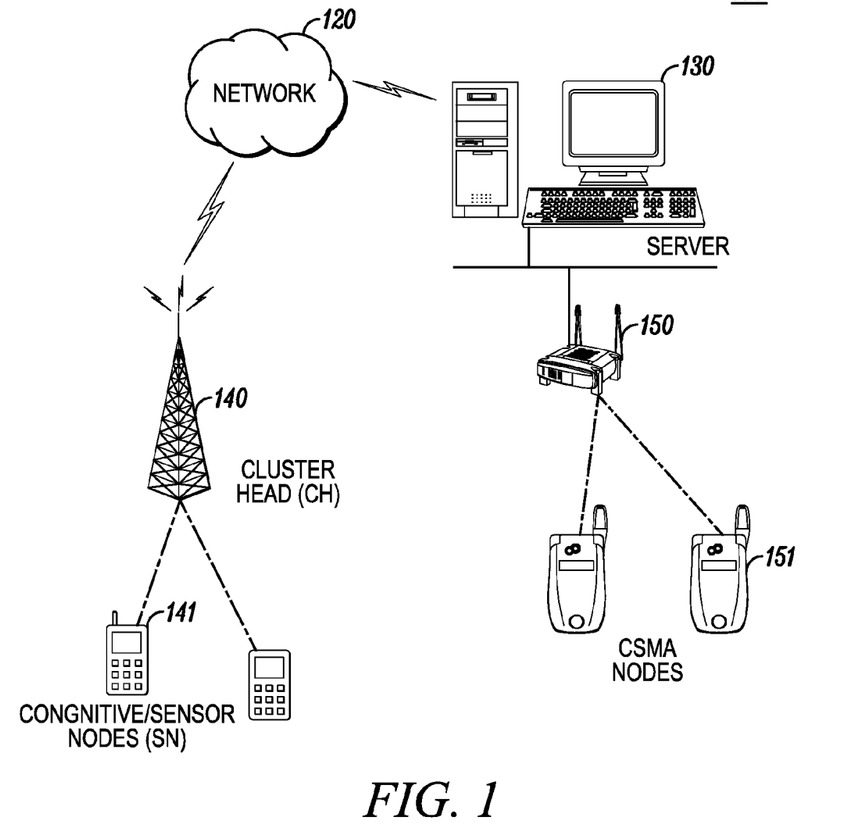
FIG. 1 is an exemplary diagram of a communication system in accordance with an embodiment of the invention.

FIG. 1 depicts an exemplary embodiment of a communication system 100. The communication system 100 can include a cognitive ad hoc network comprising one or more sensing nodes (SNs) 141 managed by a Cluster Head (CH) 140, and a wireless local area network (WLAN) comprising one or more WLAN nodes managed by an access point (AP) 150. The WLAN can include Carrier Sensing Multiple Access (CSMA) nodes 151. Cognitive nodes 141 within the cognitive ad hoc network and WLAN nodes 151 within the WLAN are not necessarily in direct communication with one another.

In a WLAN implementation, the physical layer can use a variety of technologies such as 802.11b or 802.11g Wireless Local Area Network (WLAN) technologies. The AP 150 communicatively coupled to the network 120 can connect the communication devices WLAN nodes together to form a wireless network. The physical layer may use direct sequence spread spectrum in the 2.4 GHz Band, or any other suitable communication technology. In the WLAN environment, the CSMA nodes 151 can communicate directly with one another in an ad-hoc community, peer-to-peer or mesh network.

In a RF implementation, the CH 150 can be a base station that provides RF connectivity to the one or more SNs 141. Communication can comply with a standard communication protocol such as CDMA, GSM, or Wi-MAX, or any other suitable communication protocol. In one arrangement, the Communication system 100 can operate in an Orthogonal Frequency Division Multiple Access (OFDMA) clustered topology that uses up to 80 MHz of bandwidth in the unlicensed Industrial, Scientific, and Medical (ISM) band or any of the other unlicensed bands such as 5.2, 5.4, and 5.7 GHz. The SNs 141 and the CSMA nodes 151 can share bandwidth on the unlicensed band in accordance with IEEE 802.11 communication protocols. As an example, the SNs 141 can operate in the unlicensed band using an 80 MHz channel, while the CSMA nodes 151 operate in the same unlicensed band using narrower 20 MHz wide channels.

A SN 141 within the cognitive ad hoc network can be a mobile phone, a radio, a portable music player, or any other suitable communication device. The SNs 141 are cognitive devices that alter between sensing operations and communication operations. As an example, the SN 141 can detect communication signals from one of the WLAN nodes and identify the presence of at least one CSMA node 151 before communicating on a RF channel. The CSMA node 151 can also be a mobile phone, laptop, Wi-Fi device, or any other communication device.

A CSMA node is a WLAN node 151 that listens on a RF channel before transmitting on the channel. In such regard, a CSMA node is a "listen before talk device". The CSMA node is a "polite" node in that it shares bandwidth with other devices in the communication network, such as the SNs 141. As an example, the CSMA node 151 will not transmit on a channel if it determines that the SN 141 is already transmitting or attempting to transmit on that channel. In certain cases however, the CSMA node may not be able to determine if the SN 141 is transmitting, for example, if the CSMA node is obstructed by a building, or operating under unfavorable communication conditions. In this case, the CSMA node 151 can generate interference on the channel due to the transmitted communication signals. In other cases, the CSMA node 151 may generate interference because it is operating improperly, or may be unaware that the SN 141 is transmitting on the channel. In other cases, the CSMA node 151 may occupy the channel for various periods of time that prevents other devices, such as the cognitive sensing nodes, from using the channel without interfering with the CSMA node. A communication node occupies a channel during the transmission of a communication signal.

To mitigate issues that may lead to interference, the SNs 141, by way of cooperative communication amongst one another and the CH 140, can detect and identify CSMA nodes 151 occupying the channel within the communication system 100 based on a scheduled analysis of communication signal patterns. Upon detecting the CSMA nodes 151 occupying the channel, the CH 140 can manage the SNs 141 to share bandwidth usage and resources with the CSMA nodes 151. In other arrangements, the CH 140 can inform the CSMA nodes 151 of the interference they are causing, or otherwise inform systems providing communication to the CSMA nodes 151 of the interference.

Figure 2:
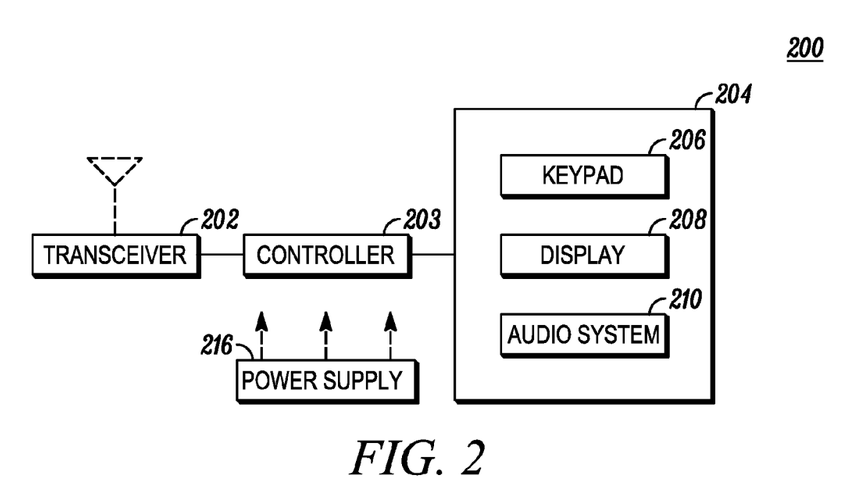
FIG. 2 is an exemplary schematic of a device within the communication system of FIG. 1 in accordance with an embodiment of the invention.

FIG. 2 depicts an exemplary embodiment of a communication device 200 within the communication system 100 (e.g. SN 141 or CSMA node 151). The communication device 200 can comprise a wireless or wireline transceiver 202, a user interface (UI) 204, a power supply 216, and a controller 203 for managing operations of the foregoing components.

The transceiver 202 can support any number of wireless access technologies including without limitation Digital Enhance Cordless Telecommunications (DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, OFDM, and EVDO. SDR can be utilized for accessing public and private communication spectrum with any number of communication protocols that can be dynamically downloaded over-the-air to the communication device 200. It should be noted also that next generation wireline and wireless access technologies can also be applied to the present disclosure. The controller 203 can utilize computing technologies such as a microprocessor and/or digital signal processor (DSP) with associated storage memory such a Flash, ROM, RAM, SRAM, DRAM or other like technologies for controlling operations of the communication device 200.

The UI element 204 can include a keypad 206 with depressible or touch sensitive keys and a navigation element such as a navigation disk, button, roller ball, or flywheel for manipulating operations of the communication device 200. The UI element 204 can further include a display 208 such as monochrome or color LCD (Liquid Crystal Display) which can be touch sensitive for manipulating operations of the communication device 200 and for conveying images to the end user of said device, and an audio system 210 that utilizes common audio technology for conveying and intercepting audible signals of the end user.

The power supply 216 can utilize common power management technologies such as replaceable batteries, supply regulation technologies, and charging system technologies for supplying energy to the components of the communication device 200 and to facilitate portable applications. Depending on the type of power supply 216 used, the communication device 200 can represent an immobile or portable communication device.

The communication device 200 can represent a single operational device or a family of devices configured in a master-slave arrangement. In the latter embodiment, the components of the communication device 200 can be reused in different form factors for the master and slave terminal devices 100. The communication device 200 can also be represented by any number of communication devices including without limitation a laptop computer, a desktop computer, a cell phone, a personal digital assistant, a set-top-box (STB), or a cordless phone just to name a few. Additionally, each of the communication device 200 can be addressed by one or more communication identifiers.

Figure 3:
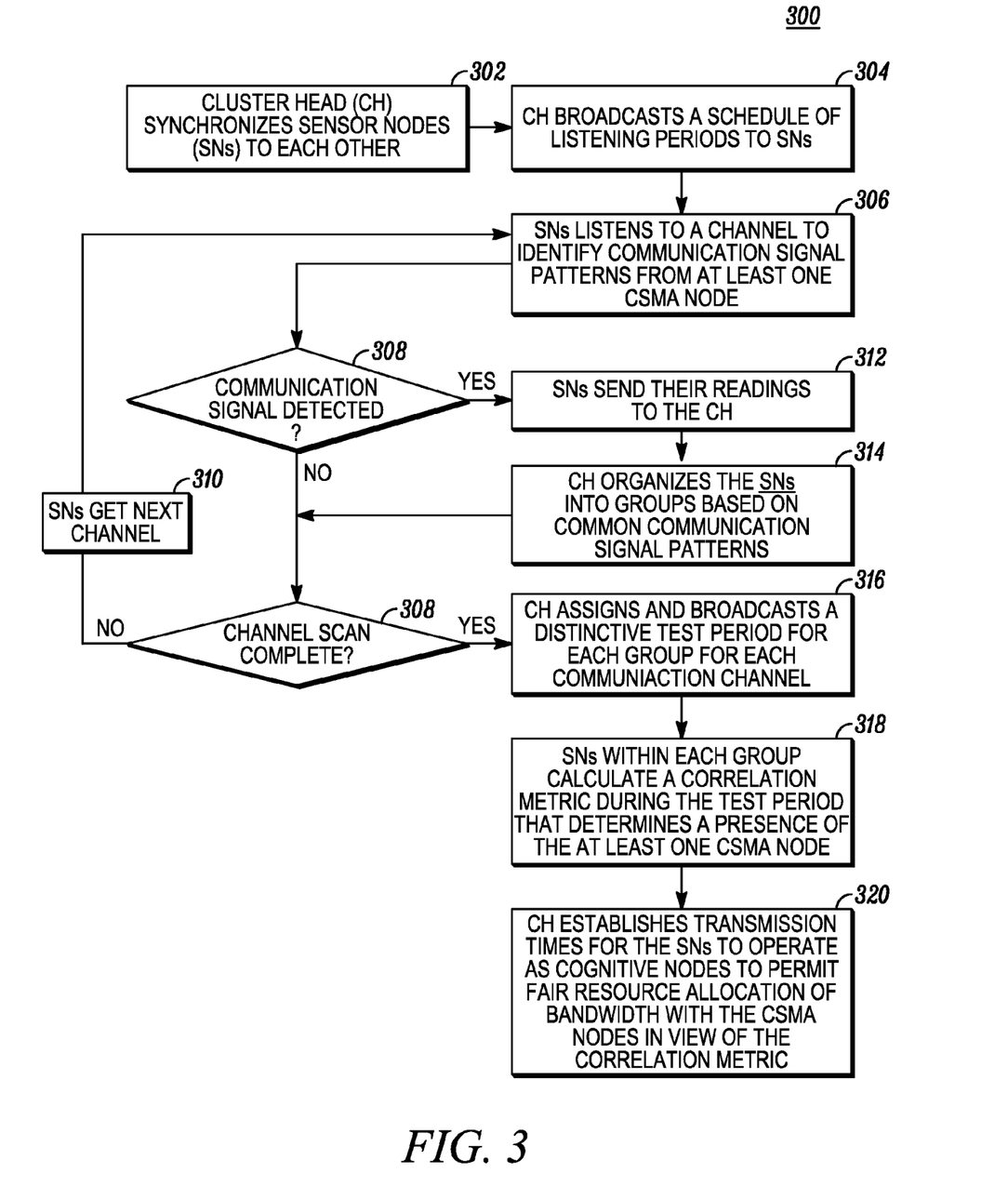
FIG. 3 is an exemplary flowchart illustrating a method of cooperation among cognitive devices in accordance with an embodiment of the invention.

FIG. 3 depicts an exemplary method 300 operating in portions of the communication system 100. Broadly stated, method 300 is directed to detecting the presence of CSMA nodes 151 within the communication system 100, based on cooperation between the plurality of SNs 141 and the CH 140. When describing method 300, references will be made to FIGS. 1 and 2, although it is understood that method 300 can be implemented in other suitable embodiments. It should also be noted that method 300 can include more or less steps and is not limited to the order of steps shown.

Method 300 can begin with step 302 in which the Cluster Head (CH) 140 synchronize SNs 141 to each other. At step 304, the CH 140 broadcasts a schedule of listening periods to the SNs 141, for example, by way of a message containing the schedule. Each SN 141 operates in accordance with the received schedule. At step 306, the SNs 141 listen to a channel to monitor communication signal patterns from at least one CSMA node 151 in accordance with the schedule. The SNs 141 can communicate amongst one another over one or more frequency channels supported in the cognitive ad hoc network.

If at step 308, a communication signal is detected on a channel, the SNs 141 send their readings to the CH 140 as shown in step 312. The readings can identify the channel or frequency on which the communication signal was detected, signal power spectrum levels, historical power spectrum levels, communication signal patterns, the time the communication signal was detected, a duration of the occupancy caused by an incumbent transmitting a communication signal, a location of the SN 141, contour information related to the location, or any other information related to the communication signal. As shown by steps 306, 308, and 310, the SNs 141 can proceed to scan through the available channels monitoring for a communication signal based on the schedule. Each SN 141 upon detecting a communication signal can proceed to step 312.

At step 314 the CH 140 responsive to receiving the readings for each channel organizes the SNs 141 into Groups based on common communication signal patterns. For example, the Groups are classified for communication signal patterns exhibiting similar changes in amplitude, phase, frequency and time. The CH 140 can determine differences between communication signal patterns and classify the communication signal patterns into separate classes indicating the Group. In such regard, all of the SNs 141 that receive or "hear" the same communication signal pattern are categorized to the same Group. The SNs 141 that are in the same Group thus receive communication signals in a single channel from the same CSMA node. A SN 141 can also belong to several groups if it can "hear" CSMA node communication signals in different channels. This allows the CH 140 to put together maps of WLAN presence for each frequency channel.

Briefly, in order to assess the similarity between communication signal patterns, the SN 141 can perform a signal processing operation such as a Filterbank, Fast Fourier Transform, or other spectral based analysis on the communicated RF signal to generate a power spectrum. The SN 141 can analyze the power spectrum to identify changes in power level among one or more frequency bands. For example, the SN 141 can average the power spectrum over time, and compare it to current power spectrum measurements. Significant spectrum level changes in a frequency band can be indicative of a communication signal. The SN 141 in view of the spectrum level changes can categorize communication signal patterns based on historic changes in amplitude, phase, and frequency over time.

Upon the completion of the channel scanning at step 308, the CH 140 at step 316 assigns and broadcasts a distinctive test period for each classified Group. That is, each Group of SNs 141 hearing the same communication signal pattern are assigned a distinctive test period specific to the Group. Moreover, the CH 140 can assign a specific test period for each channel receiving a communication signal. As discussed ahead in method 400 of FIG. 4, the test period establishes a transmit time and a listen time wherein each SN 141 within a Group takes turns transmitting a test signal and listening for changes in their communication signal patterns. This collaborative effort between the SNs 141 allows the CH 140 upon receiving their readings to detect and identify CSMA nodes 151 transmitting communication signals in the communication system 100.

Notably, the SNs 141 take turns transmitting test tones and listening for communication signal patterns to identify CSMA nodes 151 that do not respond to the test tones. In normal operation, the CSMA nodes 151, which are "polite" nodes, cease transmitting when they hear another device performing a transmit operation. These CSMA nodes 151 will retreat transmissions in the presence of a test tone, such as a busy signal transmitted by the SNs 141. However, those CSMA nodes 151 that are hidden or not willing to "listen before talk" will continue to transmit in an "impolite" manner regardless of the other devices' operation. For example, a CSMA node 151 that is hidden from receiving communication signals will continue to transmit regardless whether an SN 141 has transmitted a test tone. Those CSMA nodes 151 that do hear the test tone, will cease transmission until the test tone stops. In such regard, the SNs 141 by way of communication amongst one another can intermittently transmit test tones to determine which CSMA nodes 151 respond, thereby identifying the CSMA nodes 151 as incumbents transmitting communication signals.

At step 318, the SNs 141 within each Group calculate a correlation metric during each test period (and for each occupied communication channel) to determine the presence of at least one CSMA node 151 within the communication system 100. A negative correlation metric infers the presence of a CSMA node 151 incumbent. The duration of the test correlates with the interruption behavior (e.g. burstiness) of the communication signal. The more interrupting (e.g. bursty) the communication signal, the longer the duration required for a precise identification of the CSMA node transmitting a communication signal. The interruption of the communication signal is a function of the variance of communication signal duration and the variance of durations between two consecutive active communication signal periods. To expedite the test, the CH 140 can estimate from readings in the silence period the burstiness in each occupied communication channel and then correlate the test duration in each channel with the burstiness factor.

Figure 5:
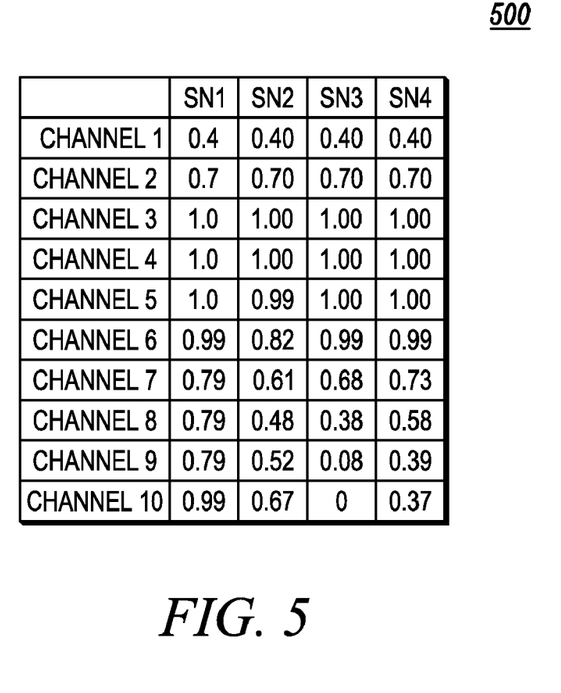
FIG. 5 is an exemplary mapping of a cognitive network in accordance with an embodiment of the invention.

Notably, the correlation metric can be calculated by each SN 141 for each occupied frequency channel. In such regard, the SNs 141 by way of a cooperative effort of transmitting test signals and listening for changes in communication signal patterns amongst one another, can identify the presence of a CSMA node 151 on each channel. Referring ahead, FIG. 5 illustrates an exemplary map 500 containing correlation values for 10 frequency channels among four SNs 141. Negative correlation values indicate a communication signal on a channel. In the example illustrated, SN 1 through SN4 all report CSMA communication signals on channel 3, 4, and 5, when using 90% for correlation filtering. A scheduler associated with the CH 140 can then use these channel mappings for channel reservation.

Upon the SNs 141 in each Group calculating the correlation metrics for each channel, the CH 140 in response to receiving the correlations and identifying negative correlations can at step 320 allocate resources among the SNs 141 when operating as cognitive devices. The CH 140 can reserve time and frequency resources for the SNs 141 in a fair arrangement with the CSMA nodes 151. For example, the CH 140 can schedule the SNs 141 to transmit 40% of the time, and release the channel to the CSMA nodes 151 the remaining 60% of the time. This provides the "polite" CSMA nodes 151 with time to transmit their own communications. The CH 140 can thus orchestrate bandwidth usage in the communication system 100 in view of the correlation metric and manage operation of the SNs 141 with the existing CSMA nodes 151 in a fair manner.

Figure 4:
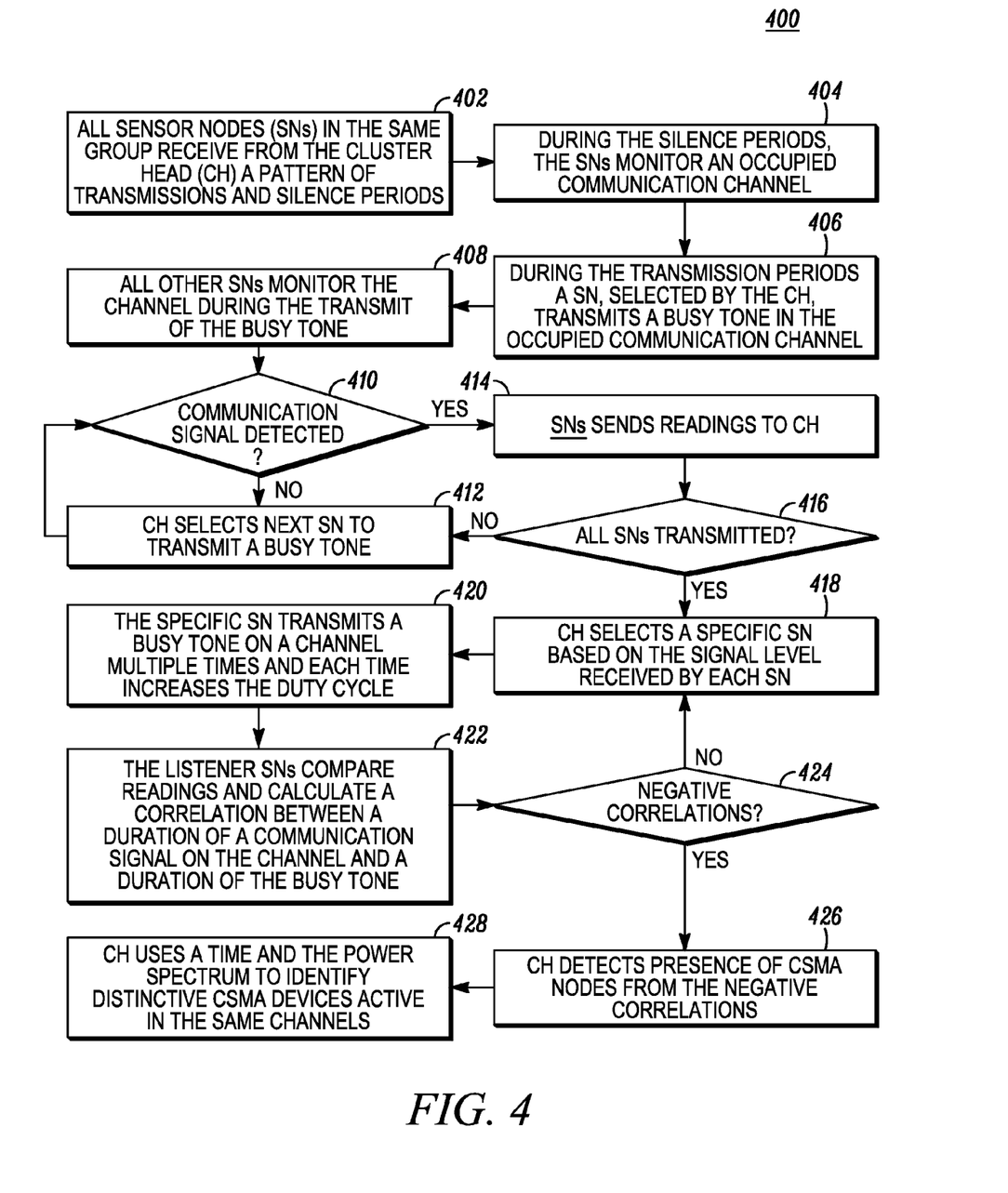
FIG. 4 is an exemplary flowchart illustrating a method to identify CSMA nodes by a cognitive network in accordance with an embodiment of the invention.
Figure 6:
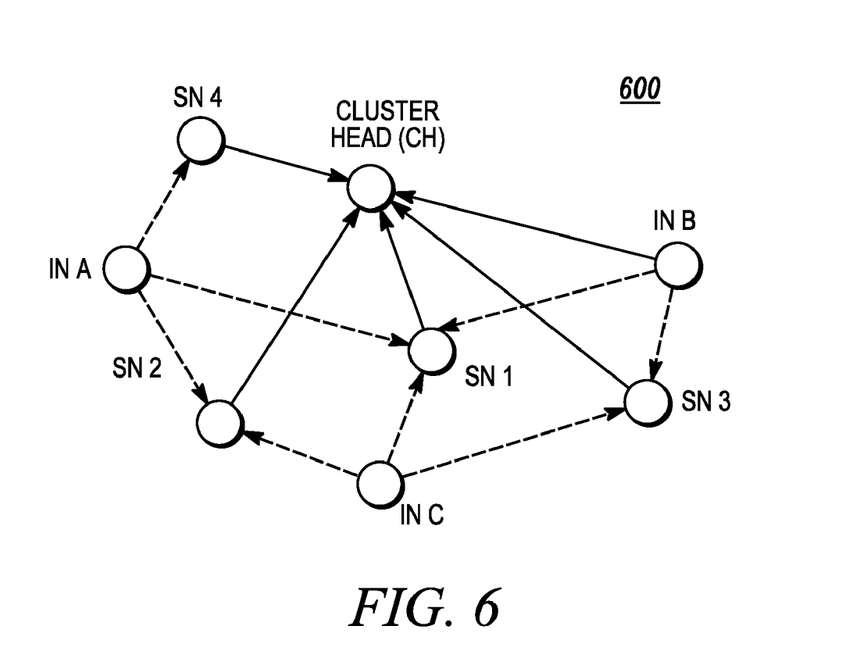
FIG. 6 is an exemplary depiction of CSMA nodes and cognitive sensory nodes in a cognitive network in accordance with an embodiment of the invention.

FIG. 4 depicts an exemplary method 400 operating in portions of the communication system 100. Briefly, method 400 is directed to calculating the correlation during the test period, which can then be used for detecting a presence of a CSMA node transmitting a communication signal 151. Method 400 provides a more detailed description to the method step 318 of FIG. 3. When describing method 400, references will be made to FIGS. 1, 2 and 6 although it is understood that method 400 can be implemented in other suitable embodiments. It should also be noted that method 400 can include more or less steps and is not limited to the order of steps shown.

The method 400 can begin in a state wherein the CH 140 has assigned and broadcasted a distinctive test period to each Group of SNs 141 for each occupied communication channel. The distinctive test period indicates when SNs within the Group take turns generating test signals for each channel and listening to resulting communication signals due to the test signals. The method 400 can begin in a state when a plurality of SNs 141 and at least one CSMA incumbent node (IN) is operating within a cognitive network. For example, referring to FIG. 6, SN1 hears INA, INB and INC WLAN nodes, SN2 senses INA, and C, SN3 senses INB, and INC, while SN4 senses only one communicating INA. Nodes INA, INB, and INC correspond to CSMA nodes 151. Because of path-loss, each CSMA incumbent node is received at different power levels. In the arrangement shown, SN1 distinguishes at various time moments three different powers in the signal level. Similarly, SN2 and SN3 each observe two power levels. When the CH 140 compares all readings received from sensor nodes, it identifies three distinct occupied communication channels based on the time-frequency patterns. The CH 140 creates three Groups of sensor nodes. Each of these groups is responsible to identify the nature of one or more incumbents during uniquely assigned time intervals.

With this in mind, method 400 can begin at step 402 in which all SNs 141 in the same Group receive from the CH 140 a pattern of transmissions and silence periods. For instance, referring to FIG. 6, CH 140 allocates a time interval to sensor nodes SN1, SN2 and SN4 to identify INA. Similarly, CH 140 allocates a different time interval to SN1, SN2 and SN3 to identify INC. CH 140 also allocates a third time interval to nodes SN1 and SN3 to identify INB. Each time interval consists of test intervals that have two periods, one for listening and one for active sensing.

During the silence period (e.g. listening period), the SNs 141 monitor an occupied communication channel as shown in step 404. The SNs 141 monitor one occupied communication channel at a time if more than one occupied communication channels have been identified. An occupied communication channel corresponds to a channel receiving a communication signal, for example, due to a CSMA node 151 transmitting on that channel or an adjacent channel. During the transmission periods (e.g. active sensing period), one SN 141, selected by the CH 140, transmits in the occupied communication channel a test signal (e.g., busy tone) as shown in step 406. During this time, all other SNs 141 monitor the channel as shown in step 408.

During the active sensing period, the single SN 141 of the group selected by the CH 140 continuously transmits the test signal (e.g., busy tone) and the other nodes listen to the channel. For instance, referring to FIG. 6, in the first group in the active sensing period, node SN4 (the closest to INA in terms of RF energy) sends a busy tone signal known to all members of the group. Node INA, which operates in CSMA mode senses the busy channel and refrains from transmitting. Nodes SN2 and SN1 compare their readings of the channel during the silence and active sensing periods over multiple test periods.

If at step 410, a communication signal is detected, the SNs 141 send their readings to the CH 140, as shown in step 414. The SNs 141 can extract patterns of communication signals from their collected data and send the readings as quantized values. In one arrangement, the SNs 141 only send the characteristics of the identified patterns to the CH 140 to limit the transmission overhead. With respect to FIG. 6, the CH 140 can interpret the readings to decide that INA is a CSMA incumbent. If however a communication signal is not detected at step 410, the CH 140 can select the next SN 141 to transmit a test signal (e.g., busy tone) at step 412. The method of transmitting a test signal by SNs 141 can continue until SNs 141 have transmitted for each occupied communication channel, as shown in step 416.

At step 418, the CH 140 selects a specific SN 141 based on the signal levels collected from each SN 141 of the Group. For instance, the CH 140 selects the SN 141 with the highest recorded signal level as the specific SN 141. This node can have the highest probability to be heard by the incumbent CSMA node 151 and therefore the ability to affect its duty cycle. At step 420, the specific SN transmits a test signal (e.g., busy tone) on a channel multiple times while each time increasing the duty cycle. (Recall, the communication signals is typically generated by only those CSMA incumbent nodes since they do not respond to the busy tone, for example, hidden CSMA nodes 151.) In one embodiment, the specific SN 141 increases the duration of the busy tone with respect to the silence period over a period of time T. The first transmission of busy tone starts when the channel is idle. The following transmissions follow a fixed schedule (no listening).

At step 422, the listener SNs 141 compare readings and calculate a correlation between a duration of the occupancy caused by an incumbent transmitting a communication signal on the channel and a duration of the busy tone. A negative correlation indicates a CSMA incumbent node. As one example, the SNs 141 can correlate a received signal against an energy mask specified by 802.11 standards to identify 802.11 active channels. As another example, the SN 141 can compare the correlation with a threshold and mark as occupied only those frequency channels of a contour map with highest correlation.

The readings are sent to the CH 140, which compares the SN readings and detects the existence of CSMA devices using the above correlations. In one arrangement, the CH 140 can use a likelihood ratio-test detector to determine the existence of a CSMA incumbent based on the correlation. If at step 424 a negative correlation is detected, the CH 140 detects a presence of a CSMA node at step 426. The CH 140 uses the negative correlations to allocate traffic in a fair manner within the communication system 100 for each area (e.g. location). For example, the CH 140 can reserve frequencies and time intervals for exclusive use by foreign CSMA devices at particular areas within the communication system 100.

As shown in step 428, the CH 140 can further use the time and power patterns previously received from the SNs 141 to identify distinctive CSMA devices active in the same channels. In one arrangement, the CH 140 can decide to operate in different channels if CSMA devices are detected, for instance by means of bandwidth adaptation, or dynamic channel selection. In this way, the cognitive network will leave the RF space for the existing CSMA devices. In another arrangement, the CH 140 can use a clustering procedure in time and power dimension to distinguish between two CSMA devices transmitting in the same channel. For instance, referring to FIG. 6, if several CSMA devices operate in the same channel (for example INB and INC), the CH 140 uses pattern recognition to infer that there are two distinctive CSMA devices operating in the area. That is, the CH 140 compares the received signal levels and communication signal times for SN1, SN2 and SN3, for instance using a 2-step clustering approach. In the first step, the CH 140 finds that the SNs 141 see two distinctive (average) power levels; in the second step, the CH 140 compares the start and stop times for each power level and notices that all 3 SN see the same patterns. It concludes that at least two CSMA devices are operating in the same channel.

The method 400 can then continue back to step 402 to repeat cooperation among SNs 141 in identifying CSMA incumbent nodes 151 or other devices transmitting communication signals. Notably, the CH 140 can adjust the Groups of SNs 141 based on detected signal levels as well as location information.

It would be evident to an artisan with ordinary skill in the art that the aforementioned embodiments can be modified, reduced, or enhanced without departing from the scope and spirit of the claims described below. For example, in another embodiment, the communication system 100 can use a single SN 141 for sensing and test signal transmission. The SN 141 can send test signals at various duty cycles and then observe the received communication signal. If a negative correlation is observed between it's own duty cycle and the received communication signal, the SN 141 can concludes that a CSMA device is present in its vicinity. Other modifications can be applied to the present disclosure without departing from the scope of the claims. Accordingly, the reader is directed to the claims below for a fuller understanding of the breadth and scope of the present disclosure.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

Figure 7:
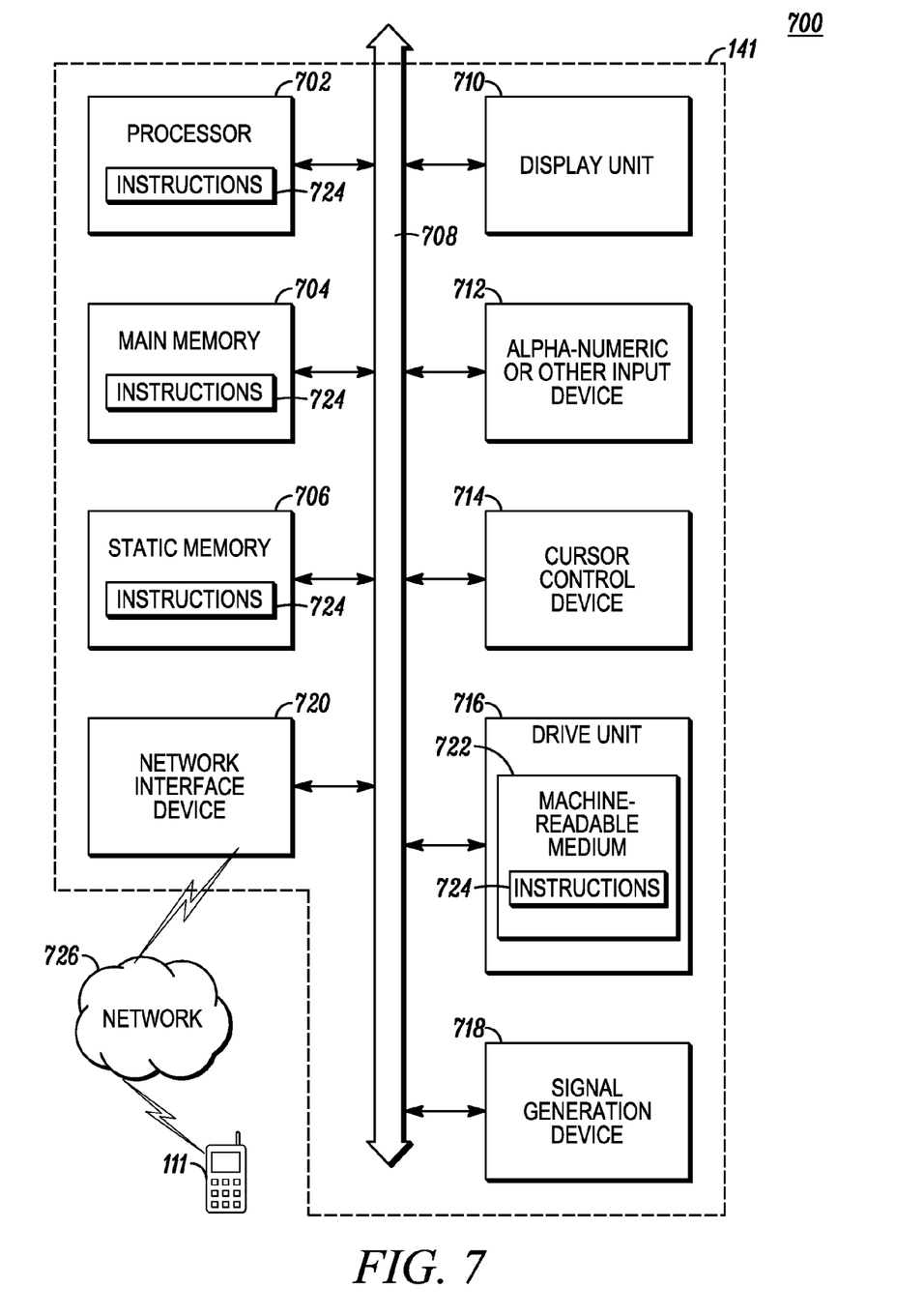
FIG. 7 depicts an exemplary diagrammatic representation of a machine in the form of a computer system within which a set of instructions, when executed, may cause the machine to perform any one or more of the methodologies disclosed herein.

For example, FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a graphical or video display unit 710 (e.g., a liquid crystal display (LCD), a flat panel, a solid state display, or a cathode ray tube (CRT)). The computer system 700 may include an input device 712 (e.g., a keypad), a cursor control device 714 (e.g., a stick), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A Cluster Head (CH) managing a plurality of Sensing Nodes (SNs) cooperatively operating within a network, the CH comprising:
   a transceiver; and
   a processor communicatively coupled to the transceiver to
      broadcast to the plurality of SNs a schedule comprising a listening period and an active sensing period; and,
      in response to communication signal readings provided from Groups of SNs according to the schedule, evaluate a correlation that determines a presence of at least one Carrier Sensing Multiple Access (CSMA) node in the network.

2. The CH of claim 1, wherein the CH allocates resources in the network to share bandwidth usage in view of the presence of the at least one CSMA node in view of the processor receiving from the SNs, communication signal patterns associated with one or more communication channels of the network in accordance with the schedule, categorizing SNs by Groups based on the communication signal patterns, and assigning a distinctive test period to the Groups.

3. The CH of claim 1, wherein the transceiver by way of the processor selectively directs one of the plurality of SNs to transmit during the active sensing period a test signal at varying duty cycles,
   wherein the remaining SNs during the listening period listen to a channel, capture communication signal patterns from the at least one CSMA Node, and send the communication signal patterns to the CH.

4. The CH of claim 1, wherein the transceiver by way of the processor
   directs the plurality of SNs to scan through all channels in accordance with the schedule, and
   selects a specific SN with a highest signal level to transmit the test signal repeatedly at increasing duty cycles within a Group.

5. The CH of claim 4, wherein the CH assigns the test signal for each group for each communication channel that is occupied.

6. The CH of claim 4, wherein a negative correlation indicates the presence of the at least on CSMA node.

7. A sensing device, comprising
   a transceiver to monitor a communication signal; and
   a processor communicatively coupled to the transceiver to
      receive from a Cluster Head (CH) a schedule comprising a listening period and an active sensing period;
      during the listening period, monitor an occupied communication channel of the communication signal; and
      during the active sensing period, transmit in the occupied communication channel a test signal wherein the processor increases a duty cycle of the test signal during repeated transmission.

8. The sensing device of claim 7, wherein a first transmission of the test signal starts when the occupied communication channel is idle.

9. The sensing device of claim 7, wherein the processor calculates a correlation between a duration of an occupancy caused by an incumbent transmitting a communication signal in the communication channel and a duration of the test signal.

10. The sensing device of claim 9, wherein the transceiver by way of the processor transmits negative correlations to the CH to identify the presence of a Carrier Sensing Multiple Access (CSMA) node transmitting a communication signal.

11. The sensing device of claim 7, wherein during the listening period the processor monitors a test signal transmitted by another sensing device to identify occupied communication channels.

12. A method for cognitive mode identification in a clustered network, the method comprising the steps of:
   broadcasting a schedule to a plurality of Sensor Nodes (SNs) in a cognitive network, wherein the SNs listen to communication signals and report communication signal patterns to a Cluster Head (CH) in accordance with the schedule;
   organizing SNs by Groups based on common reported communication signal patterns;

assigning a distinctive test period to the Groups for an occupied communication channel, wherein the test period comprises a listening period and an active sensing period for the SNs;

detecting a presence of at least one Carrier Sensing Multiple Access (CSMA) node in response to the test period; and allocating resources in the network for fair use of bandwidth in view of the presence of the at least one CSMA node, wherein during the test period the SNs compare communication signal readings in response to cooperatively transmitting test signals and listening for resulting communication signal produced from the at least one CSMA node on scanned channels.

13. The method of claim 12, further comprising selecting a specific SN within a Group to transmit during the active sensing period based on a communication signal level received from the at least one CSMA node.

14. The method of claim 12, further comprising calculating a correlation between a duration of an occupancy caused by an incumbent transmitting a communication signal in the communication channel and a duration of the test signal.

15. The method of claim 12, further comprising detecting the presence of the at least one CSMA device if the correlation is negative.

16. The method of claim 15, wherein the CSMA node is a listen before talk device that estimates channel state and then transmits only if it perceives the channel to be unoccupied.

17. The method of claim 12, further comprising repeating the assigning of the distinctive test period to each Group to increase detection probability of the at least one CSMA node.

18. The method of claim 12, wherein the SNs cooperate amongst one another in accordance with the schedule to detect and identify incumbent devices within a cognitive ad hoc network.

19. The method of claim 18, further proactively sensing the incumbent devices at a geographic location within the cognitive ad hoc network.

* * * * *